United States Patent
Plotts et al.

(10) Patent No.: US 8,595,303 B2
(45) Date of Patent: Nov. 26, 2013

(54) THREAD DATA AGGREGATION

(75) Inventors: Dylan J. Plotts, Palo Alto, CA (US); Patrick McClanahan Kaze, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 12/792,488

(22) Filed: Jun. 2, 2010

(65) Prior Publication Data
US 2011/0302250 A1 Dec. 8, 2011

(51) Int. Cl.
G06F 15/16 (2006.01)

(52) U.S. Cl.
USPC .......................................................... 709/206

(58) Field of Classification Search
USPC ................................ 709/205–207; 379/88.13
See application file for complete search history.

(56) References Cited

U.S. PATENT DOCUMENTS

| | | | |
|---|---|---|---|
| 5,832,483 A | 11/1998 | Barker | |
| 7,490,072 B1 | 2/2009 | Cowan et al. | |
| 7,506,263 B1 | 3/2009 | Johnston et al. | |
| 7,552,189 B2 | 6/2009 | Mehra | |
| 7,603,719 B2 | 10/2009 | Thomas et al. | |
| 7,979,495 B2* | 7/2011 | Radenkovic et al. | 709/206 |
| 2005/0038687 A1* | 2/2005 | Galdes | 705/9 |
| 2006/0053204 A1 | 3/2006 | Sundararajan et al. | |
| 2006/0083358 A1* | 4/2006 | Fong et al. | 379/88.13 |
| 2006/0195785 A1 | 8/2006 | Portnoy et al. | |
| 2007/0006089 A1 | 1/2007 | Bales et al. | |
| 2007/0136796 A1 | 6/2007 | Sanchez et al. | |
| 2008/0162651 A1 | 7/2008 | Madnani | |
| 2008/0244372 A1 | 10/2008 | Rohall et al. | |
| 2008/0301250 A1* | 12/2008 | Hardy et al. | 709/207 |
| 2008/0313292 A1* | 12/2008 | Forstall et al. | 709/206 |
| 2009/0287780 A1* | 11/2009 | Gawor et al. | 709/206 |
| 2010/0030798 A1 | 2/2010 | Kumar et al. | |
| 2010/0318555 A1* | 12/2010 | Broder et al. | 707/769 |

OTHER PUBLICATIONS

Ulrich, et al., "Regression-Based Summarization of Email Conversations", Retrieved at << http://aaai.org/ocs/index.php/ICWSM/09/paper/viewFile/188/505 >>, In Proceedings of the 3rd International AAAI Conference on Weblogs and Social Media, ICWSM, 2009, pp. 334-337.

Zajic, et al., "Single-Document and Multi-Document Summarization Techniques for Email Threads Using Sentence Compression", Retrieved at << http://www.umiacs.umd.edu/~jimmylin/publications/Zajic_etal_IPM2008.pdf >>, Information Processing and Management: an International Journal, vol. 44, No. 4, Jul. 2008, pp. 1-13.

Acharya, Anurag et al., "MAPbox: Using Parameterized Behavior Classes to Confine Untrusted Applications", *Proceedings of the 9th USENIX Security Symposium*, Available at <http://www.usenix.org/events/sec00/full_papers/acharya/acharya.pdf>,(Aug. 2000), 18 pages.

(Continued)

*Primary Examiner* — Scott Christensen
(74) *Attorney, Agent, or Firm* — Wolfe-SBMC

(57) ABSTRACT

Techniques for thread data aggregation are described. In implementations, metadata is identified for a new message associated with a conversation thread. The metadata is added to conversation metadata that is associated with the conversation thread and attached to an anchor message associated with the conversation thread. The addition of the metadata to the conversation metadata creates aggregate thread data. The aggregate thread data is moved from the anchor message to the new message.

20 Claims, 5 Drawing Sheets

(56) References Cited

OTHER PUBLICATIONS

Koch, Bert F., "A QoS Architecture with Adaptive Resource Control: The AQUILA Approach", *Siemens, ICN WN CC EK A 19*, Available at <http://st.inf.tu-dresden.de/aquila/files/pub/comcon8-sag-qos_architecture-paper.pdf>, (1999), 10 pages.

Shirley, Jeff et al., "The User is Not the Enemy: Fighting Malware by Tracking User Intentions", *NSPW* 2008, Available at <http://www.cs.virginia.edu/~evans/pubs/nspw08/nspw27-shirley.pdf>, (Sep. 2008), 13 pages.

Xu, Cheng-Zhong et al., "Privilege Delegation and Agent-Oriented Access Control in Naplet", *Proceedings of the 23rd International Conference on Distributed Computing Systems*, http://www.google.co.in/url?sa=t&source=web&ct=res&cd=20&ved=0CCkQFjAJOAo&url=http%3A%2F%2Fciteseerx.ist.psu.edu%Fviewdoc%2Fdownload%3Fdoi%3D10.1.1.126.4175%26rep%3Drep1%26type%3Dpdf&rct=j&q=resource+access+control+confined+application&ei=kiOeS9jvL8yLkAWX,(2003),5 pages.

\* cited by examiner

THREAD DATA AGGREGATION

BACKGROUND

Email (also referred to as electronic mail) allows users to exchange content across a network. As email gains ever increasing use, however, a heavier corresponding burden is placed on servers to store and maintain data for users. Consequently, management of such a large number of emails may be difficult using traditional techniques. Thus, this burden may slow performance of email functionality at the servers, causing slow performance at a client, which may result in a poor user experience.

SUMMARY

Techniques for thread data aggregation are described. In implementations, metadata is identified for a new message associated with a conversation thread. The metadata is added to conversation metadata that is associated with the conversation thread and attached to an anchor message associated with the conversation thread. The addition of the metadata to the conversation metadata creates aggregate thread data. The aggregate thread data is moved from the anchor message to the new message.

In implementations, aggregate thread data associated with an anchor message in a conversation thread is updated. Metadata associated with a message that is associated with a conversation thread is identified. The metadata associated with the message is added to the aggregate thread data.

In implementations, one or more computer-readable media comprise instructions stored thereon that, responsive to execution by a computing device, causes the computing device to identify metadata associated with a new message that is part of a conversation thread. The instructions further cause the computing device to add the metadata to conversation metadata associated with the conversation thread, thereby creating aggregate thread data. The conversation metadata may be stored in a header for an anchor message associated with the conversation thread. The instructions further cause the computing device to move the aggregate thread data from the anchor message to the new message.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Sometimes, when a user accesses an email account, the user often glances solely at the subject line of an email, who sent the email, and when the email was sent. This information is generally presented in a header for each email. Often, the user may receive a reply to a previously sent email. Both the reply and the previously sent email create a conversation and may be linked together in a conversation thread. However, using traditional techniques, header information for an email in a conversation may lack information pertaining to the entire conversation. Also, traditional techniques for storing a high volume of email conversations along with associated metadata may be costly and difficult to manage, which may slow performance of email functionality at the server.

Techniques for thread data aggregation are described. In implementations, a new email to be delivered to a user is received and stored at a server. The server is configured to determine whether the new email is part of a conversation. For instance, the new email may be a reply to another email and thus, the new email may be linked to the other email in a conversation thread. The server is also configured to aggregate metadata for each of the emails in the conversation thread. The new email, being the most recent message in the conversation thread, may then become an anchor message for the conversation thread from which to attach the aggregate metadata for the entire conversation. By doing so, the aggregate metadata for the conversation may be stored and displayed for the user as part of the header of the new message. The aggregate metadata may include information about the whole conversation and the emails therein, such as the total number of emails in the conversation, the number of unread emails in the conversation, and/or the names of senders of emails in the conversation. Thus, management of information concerning the entire conversation using traditional techniques is improved upon by implementing techniques for thread data aggregation.

In the discussion that follows, a section entitled "Example Environment" describes an example environment and devices, which may be employed to provide thread data aggregation in various embodiments. Following this, a section entitled "Example Procedures" describes example techniques related to thread data aggregation in accordant with one or more embodiments. Last, a section entitled "Example Devices" is provided and describes example devices that can be used to implement one or more embodiments of techniques for thread data aggregation.

Example Environment

Figure 1:
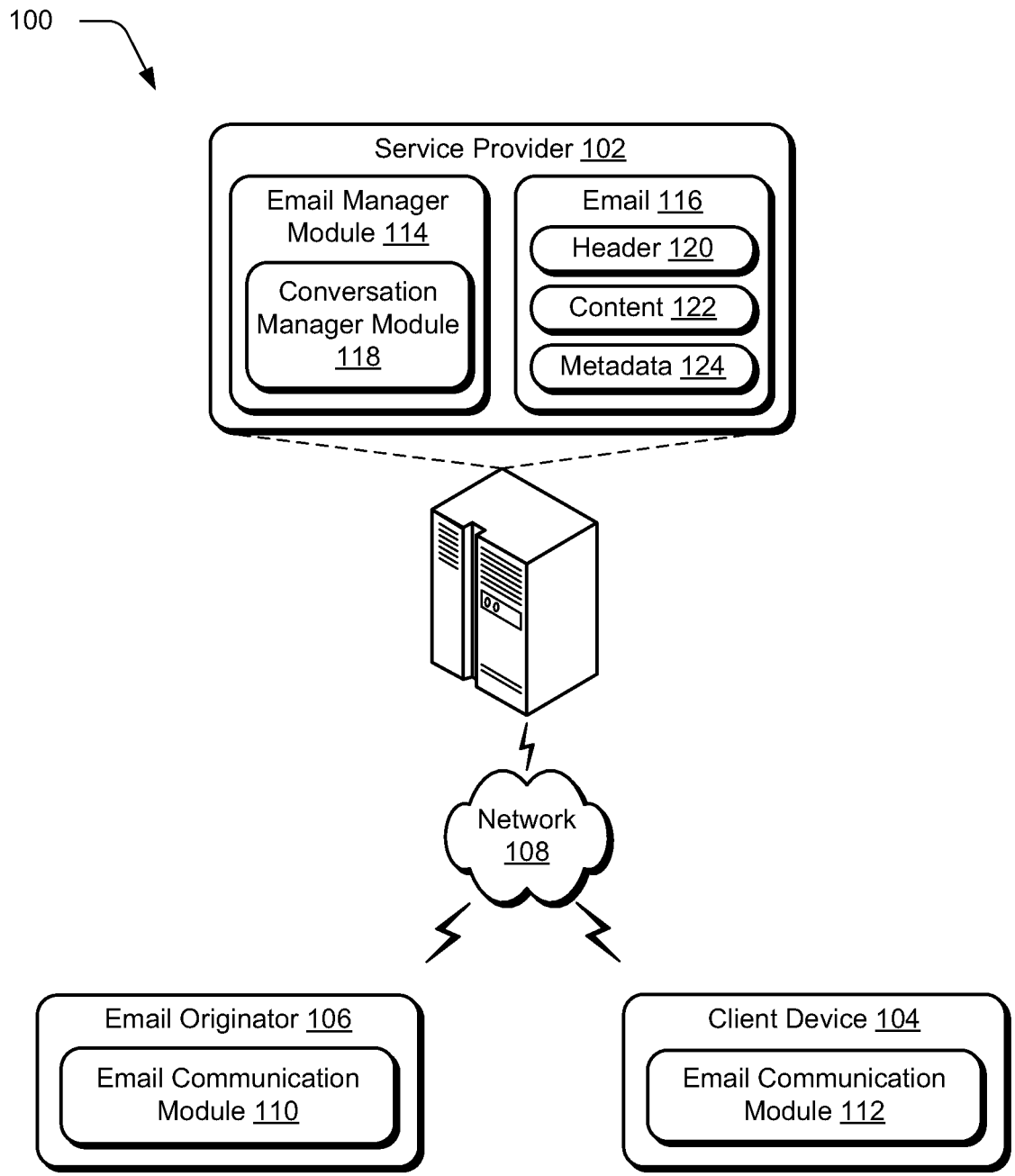
FIG. 1 is an illustration of an environment in an example implementation that is operable to perform techniques for thread data aggregation.

FIG. 1 is an illustration of an environment 100 in an example implementation that is operable to employ techniques for thread data aggregation. The illustrated environment 100 includes a service provider 102, a client device 104, and an email originator 106, each of which are communicatively coupled, one to another, over a network 108. The client device 104 and the email originator 106 may be implemented via a variety of different computing devices. For example, the client device 104 and/or the email originator 106 may be configured as a computer that is capable of communicating over the network 108, such as a desktop computer, a mobile station, an entertainment appliance, a set-top box communicatively coupled to a display device, a wireless phone, a netbook, a tablet computer, a game console, and so forth. Thus, the client device 104 and/or the email originator 106 may range from full resource devices with substantial memory and processor resources (e.g., personal computers, game consoles) to a low-resource device with limited memory and/or processing resources (e.g., traditional set-top boxes, hand-held game consoles). Likewise, the service provider 102 may be implemented by one or more computing devices, such as through one or more servers as illustrated.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks. For instance, the email originator 106 and the service provider 102 may use a corporate Intranet to communicate, one to another. Additionally, both the client device 104 and the service provider 102 may be communicatively coupled over the Internet. A wide variety of other instances are also contemplated.

Both the email originator 106 and/or the client device 104 are illustrated as having email communication modules 110 and 112, respectively. These email communication modules 110 and 112 represent functionality to create, send, and/or receive emails over the network 108. For instance, an email may be created using the email communication module 110 at the email originator 106 and then sent over the network 108 to the service provider 102 for delivery to the client device 104. Once the service provider 102 routes the email to the client device 104, the email communication module 112 at the client device 104 represents functionality to receive the email and present the email for a user.

Before the email sent by the email originator 106 is delivered to the client device 104, the email may be processed at the service provider 102. The service provider 102 is illustrated as having an email manager module 114 that is representative of functionality of the service provider 102 to manage email 116 delivery for emails 116 composed at the email originator 106 for delivery to the client device 104, e.g., through a "store and forward" technique. Other embodiments are also contemplated, however, such as through direct delivery of the email from the email originator 106 to the client device 104 (e.g., the email originator 106 and the service provider 102 are combined). For purposes of the following discussion, the email 116 may be representative of one or more emails. Accordingly, the email 116 may be referred to in singular (e.g., the email 116) and plural (e.g., the emails 116) forms.

The email manager module 114 is illustrated as having a conversation manager module 118 that is representative of functionality of the service provider 102 to manage emails 116 that are part of a conversation, such as an email sent as a reply to another email. In embodiments, the email manager module 114 may be configured to link the emails together in a conversation thread. Linking emails in this way allows the emails to be stored and presented together along with metadata associated with the entire conversation.

An email 116 received by the service provider 102 may include a header 120 and content 122. The header 120 may include information that is usable to deliver the email 116, such as an email address of an intended recipient, e.g., the client device 104. The header 120 may also include other information such as an email address of the email originator 106, a subject header, and so on.

The content 122 may be representative of a variety of different types of content that may be included in the email 116. For example, the content 122 may include textual content that may be configured in a variety of different ways, such as text of a letter, billing information, purchase confirmation information, contact information, banking information, scheduling information, and so on. The content 122 may also include a variety of non-textual content, such as images, music files, video files, links to other content over the network 108, and so on.

The email 116 is further illustrated as including metadata 124 that describes the email 116. For example, the metadata 124 may describe properties of the email 116, such as whether the email is unread or read by the recipient. Other information included in the metadata 124 may include the name of the sender of the email, or information indicative of whether the email is flagged or is included in folders and/or subfolders.

For an email 116 that is associated with a conversation thread, for instance, the metadata 124 included in the email 116 may be identified by the conversation manager module 118. In embodiments, the conversation manager module 118 may be configured to aggregate the metadata 124 for the emails in the conversation thread. This aggregated metadata is representative of information associated with a conversation thread as a whole. For example, aggregate metadata may include a number of unread emails in the conversation thread, a total number of emails in the conversation thread, or identification of the email originators 106 of the emails in the conversation thread. Aggregate metadata may also include properties that are common to one or more emails in the conversation thread. In addition, the aggregate metadata may include folders or subfolders associated with the emails 116 in the conversation thread. A variety of suitable types of information regarding the emails 116 in the conversation thread may be aggregated to represent the conversation thread in its entirety.

Any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices, such as digital video discs (DVDs), read-only memory (ROM), compact discs (CDs), hard drives, flash drives, and so on. The features of the email view techniques described below are platform-independent, meaning that the techniques may be implemented on a variety of commercial computing platforms having a variety of processors.

Figure 2:
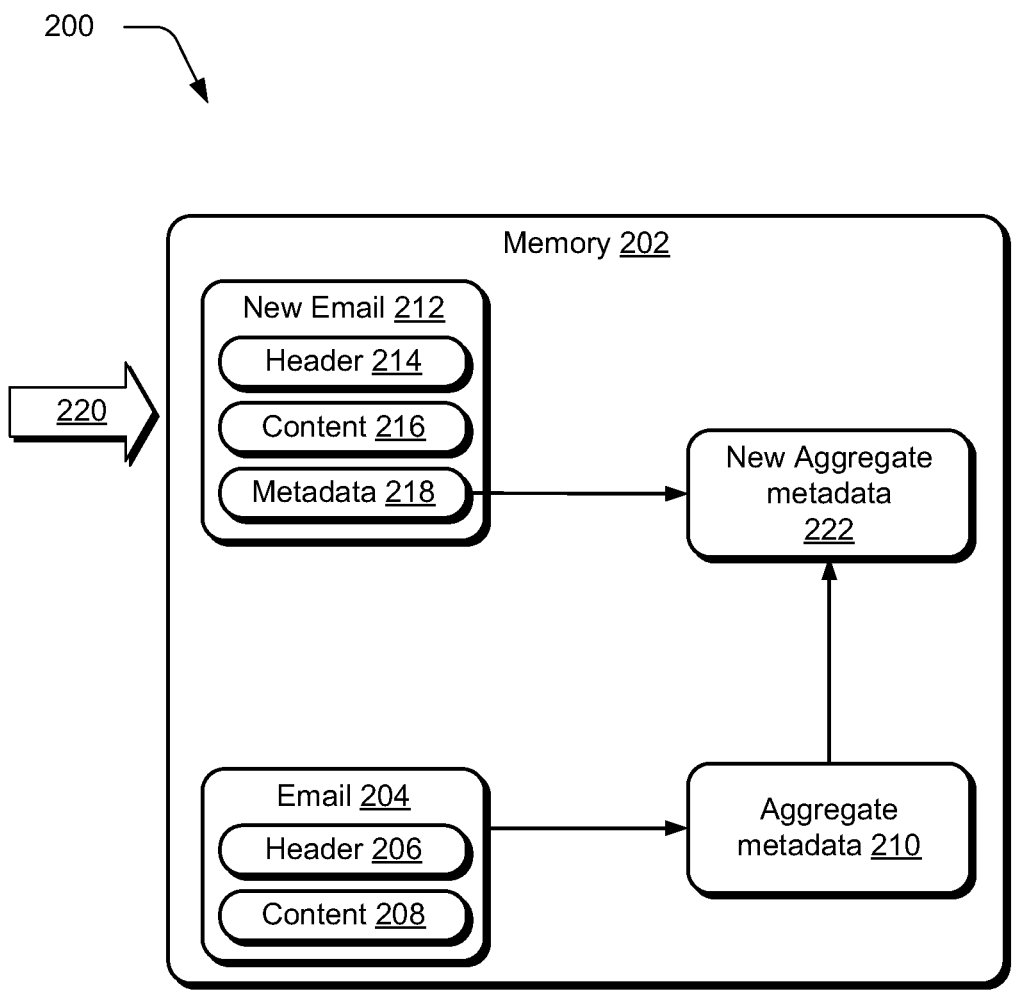
FIG. 2 is an illustration of an example implementation of thread data aggregation.

Consider now FIG. 2, which is an example 200 of an implementation of thread data aggregation. A memory 202 is illustrated as storing one or more emails 204 associated with a conversation thread. The emails 204 may include headers 206 and content 208. The memory 202 is also illustrated as storing aggregate metadata 210 that is an aggregation of metadata associated with each email 204 in the conversation and that is attached to the email 204, which in this example is an anchor message for the conversation.

A new email 212 that includes a header 214, content 216, and metadata 218 may be received via a network connection 220 and associated with the conversation thread. Once the association is made, metadata 218 describing the new email 212 may be added to the aggregate metadata 210 to create new aggregate metadata 222. The new aggregate metadata 222 for the conversation thread may then be associated (e.g., moved or attached) with the new email 212 and stored as an extension to the header of the new email 212. Moving the new aggregate metadata 222 to the new email from the "old" email 204 in this manner improves upon traditional techniques for storing metadata for emails in a conversation by minimizing the amount of storage used for storing metadata associated with emails in a conversation thread and by marking the position of the newest message in a conversation, thereby allowing the message to act as a full representation of the conversation of which it is a part.

By way of example and not limitation, one or more modules may include the following API to store aggregate thread data as a header extension for a message in a conversation thread:

```
ALTER TABLE tbl_Header ADD
    [isConvAnchor] BITNULL,
    [totalConvMessageCount] INTNULL,
    [unreadConvMessageCount] INT SPARSE NULL,
    [convCategories] VARCHAR(342) SPARSE NULL,
    [convFolders] VARCHAR(342) SPARSE NULL,
    [convFlags] TINYINT SPARSE NULL,
    [convXmlBlob] XML SPARSE NULL
GO
```

In the above API definition, the is ConvAnchor describes whether a message is the anchor message for the conversation thread. The anchor message may be the most recent message in the conversation thread. The totalConvMessageCount describes the total number of messages in the conversation thread. The unreadConvMessageCount describes a number of unread messages in the conversation thread. The convCategories is an aggregation of properties across each of the messages in the conversation thread. Such properties may include flagged messages, sender information, or whether a message was sent from a contact of the recipient, the type or characteristics of the message content, and many other attributes of the message. The convFolders is an aggregation of each of the folders and/or subfolders of each of the messages in the conversation thread. The convFlags is an aggregation of flags throughout the conversation thread. The convXmlBlob is included for future expansion.

Including additional fields or columns along with the XML blob in the above API example allows quick access to query on a specific field. For instance, a query made to locate each of the conversations in an account with unread messages or flagged messages may consume time and resources if XML each conversation is parsed. However, including the additional fields or columns along with the XML blob allows the parsing of each conversation to be avoided, thus conserving time and resources.

The is ConvAnchor bit, as described above, indicates whether or not a message is the most recent message in the conversation. Utilized with the totalConvMessageCount, various distinct states may be indicated, including:

| isConvAnchor | totalConvMessageCount | What does it mean? |
|---|---|---|
| NULL | (Any) | This message has not been processed yet due to lazy processing rules (described below). |
| 0 | (Any) | This message is part of a conversation, but it is not the anchor message. |
| 1 | 1 | This message is a singleton. |
| 1 | >1 | This message is an anchor that contains a conversation summary. |

Sometimes, such as when the conversation contains a single message, it is beneficial to avoid storing a complete set of metadata. In the particular case where a conversation contains a single message, the conversation metadata is the same as the message metadata, so there is no reason to store it twice. By using the is ConvAnchor bit alone, storage and IO resources are conserved, but the anchor and aggregate properties of the conversation and the benefits they provide are still available.

The above information is but one example of information that may be obtained concerning messages in a conversation thread and is not to be considered as a limitation to the embodiments described herein. Having described various components utilized to employ techniques for thread data aggregation, consider now example procedures that may be implemented in conjunction with the components to provide thread data aggregation.

Example Procedures

The following discussion describes techniques for thread data aggregation that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and example 200 of FIG. 2.

Figure 3:
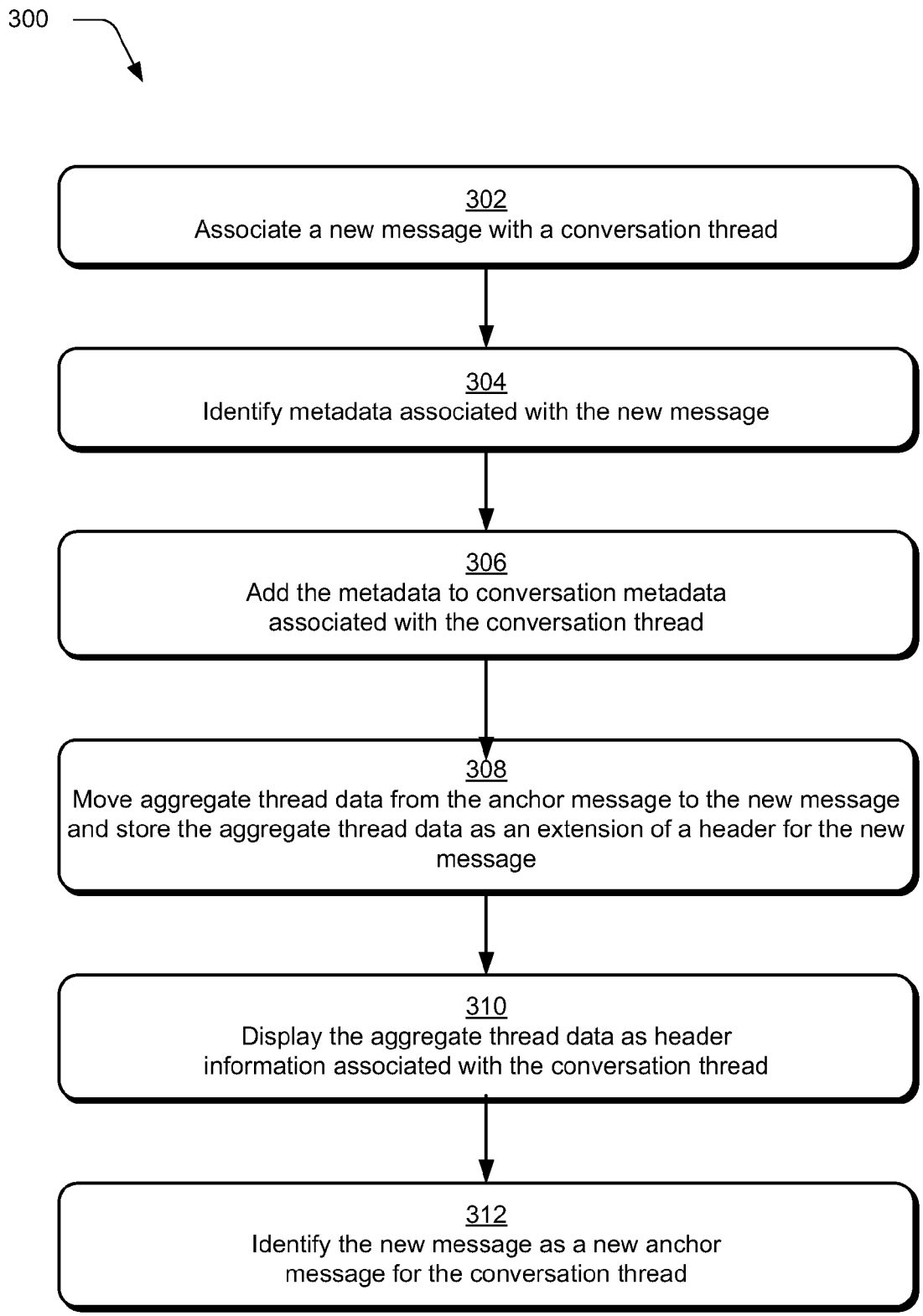
FIG. 3 is a flow diagram depicting a procedure in an example implementation that is operable to provide thread data aggregation.

FIG. 3 depicts a procedure 300 in an example implementation that is operable to provide thread data aggregation. In at least some embodiments, procedure 300 may be performed by a suitably configured computing device such as client device 104, or by a service provider 102, or by a service provider 102 and client device 104 in combination, and so on.

A new message received is associated with a conversation thread (block 302). The conversation thread is a group of emails that include the same subject and/or that were sent as replies to other messages in the thread. Additionally, the conversation thread may be a new or pre-existing conversation thread. The new message may be associated with the conversation thread by linking the new message to the conversation thread. In at least some embodiments, a link may be created by assigning a conversation ID to the new message to match that of the conversation thread. A matching conversation ID may establish a membership in the conversation thread for the new message.

Once the association is made, metadata associated with the new message is identified (block 304). This metadata may include information that describes the new message such as, for example, whether the new message has been read or is unread. Other information included in the metadata may include whether the new message is included in any folders or subfolders. The metadata may also include information regarding various properties of the new message, such as whether the new message has been flagged or whether the originator of the new message is a contact of the recipient.

The metadata may include any other information that is suitable to describe the new message.

The metadata is added to conversation metadata associated with the conversation thread (block 306). Whether the conversation thread is new or pre-existing, the metadata from the new message may be aggregated with metadata representing the conversation thread and messages in the thread. This aggregated metadata may be referred to as aggregate thread data and may include, but is not limited to, information such as the total number of emails in the conversation thread and/or the total number emails considered unread or read. Aggregate thread data may also include the names and/or emails of each of the senders represented in the conversation thread. In some embodiments, the aggregate thread data may include properties aggregated across each of the messages in the conversation thread, such as flagged messages. The aggregate thread data may also include folders and/or subfolders of the messages in the conversation thread.

Once the metadata is aggregated, the aggregate thread data is moved to the new message and stored as an extension of a header for the new message (block 308). The new message may then become an anchor message for the conversation thread. In at least some embodiments, the conversation thread may include a single anchor message from which to attach the aggregate thread data for the conversation thread. This may allow less storage space to be used when storing information regarding conversation threads, particularly for conversations with a large number of messages.

The aggregate thread data is displayed as header information associated with the conversation thread (block 310). In one or more implementations, displaying the aggregate thread data in this manner allows a user to easily view summary information about a conversation. This information is displayed as a unit and can include information such as that described above.

The new message is identified as a new anchor message for the conversation thread (block 312). As the new anchor message, the new message may be associated with the aggregate thread data for the conversation thread. The new message may continue to be identified as the new anchor message for the conversation thread until it is no longer the most recent message in the thread.

Figure 4:
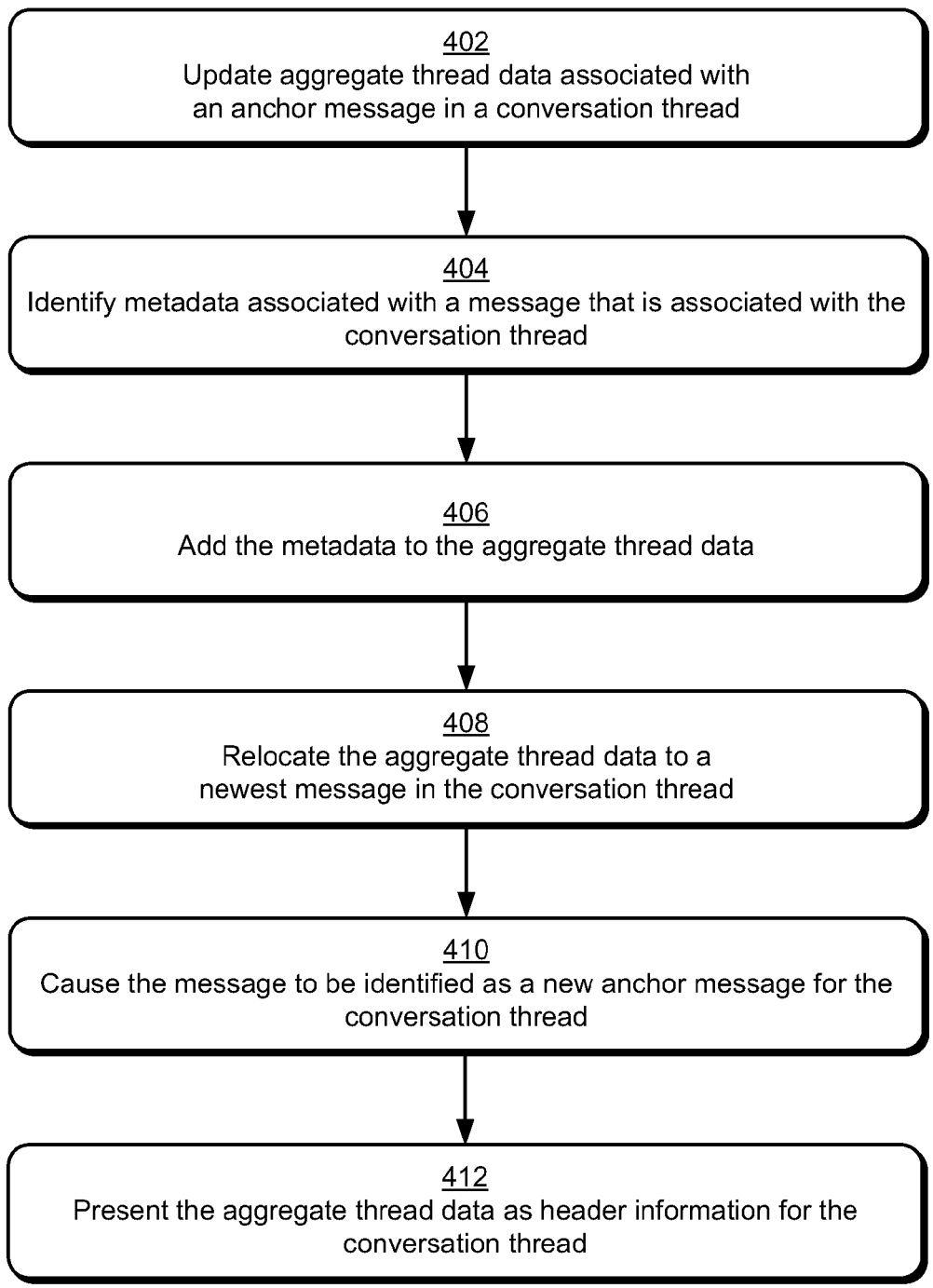
FIG. 4 is a flow diagram depicting a procedure in an example implementation that is operable to provide thread data aggregation.

FIG. 4 depicts a procedure 400 in an example implementation that includes an update to aggregate thread data. The aggregate thread data associated with an anchor message in a conversation thread is updated (block 402). In at least some embodiments, the aggregate thread data may be updated in a "lazy" fashion. For instance, using lazy processing rules, updates may occur when desired by the system (e.g., on an "as needed" basis), when the system has excess capacity, and so on. One example of a lazy update of the aggregate thread data may be an update when a new message is delivered to the thread, or another change affects the aggregate thread data and the user is not logged in, metadata updates may be deferred until a later time. For example, a message in the thread that causes a change in status from an unread state to a read state may affect the aggregate thread data.

In other embodiments, the aggregate thread data may be updated when, at a time that a user logs in, the anchor message is not the most recent message in the conversation thread. In this case, although updates to the aggregate thread data may have been available before user login, the updates are not performed until the user logs in. Updates to the aggregate thread data may also be performed when the service provider 102 has excess capacity, such as at an off-peak time. In this manner, the service provider 102 may perform the updates without suffering capacity or bandwidth restrictions. Additionally, performing updates to conversation threads according to lazy processing rules may significantly minimize I/O impact while at the same time provide a relatively quick response time.

When the update occurs, metadata associated with the message that is a member of the conversation thread is identified (block 404). Once the metadata is identified, the metadata is added to the aggregate thread data to represent information about the entire conversation thread (block 406). The aggregate thread data is then relocated from the anchor message to a newest message in the conversation thread (block 408). In some embodiments, the aggregate thread data may be stored as a header extension for the newest message. The newest message may then be identified as a new anchor message for the conversation thread (block 410). The aggregate thread data is then displayed as header information for the conversation thread (block 412).

Example Device

Figure 5:
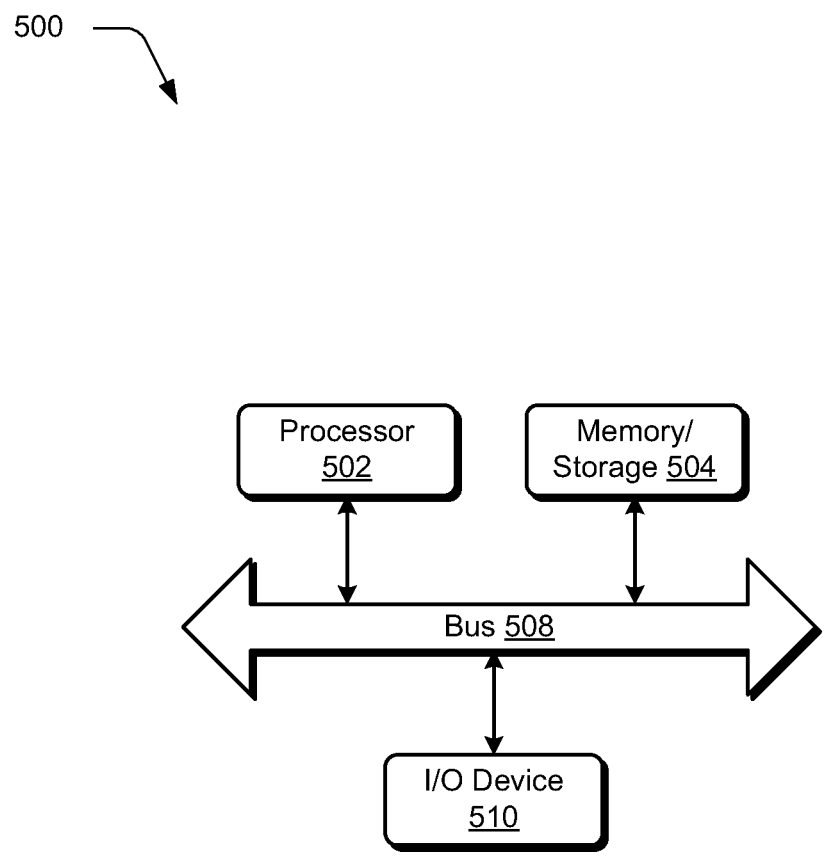
FIG. 5 is an illustration of an example computing device that may implement various embodiments of thread data aggregation.

FIG. 5 illustrates an example computing device 500 that may implement the various embodiments described above. Computing device 500 may be, for example, a client device 104 of FIG. 1, a service provider 102, or any other suitable computing device.

Computing device 500 includes one or more processors or processing units 502, one or more memory and/or storage components 504, one or more input/output (I/O) devices 506, and a bus 508 that allows the various components and devices to communicate one to another. The bus 508 represents one or more of several types of bus structures, including a memory bus or memory controller, a peripheral bus, an accelerated graphics port, and a processor or local bus using any of a variety of bus architectures. The bus 508 can include wired and/or wireless buses.

Memory/storage component 504 represents one or more computer storage media. Memory/storage component 504 may include volatile media (such as random access memory (RAM)) and/or nonvolatile media (such as read only memory (ROM), Flash memory, optical disks, magnetic disks, and so forth). Memory/storage component 504 may include fixed media (e.g., RAM, ROM, a fixed hard drive, etc.) as well as removable media (e.g., a Flash memory drive, a removable hard drive, an optical disk, and so forth).

One or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. Computer-readable media may include a variety of available medium or media that may be accessed by a computing device. By way of example, and not limitation, computer-readable media may comprise "computer-readable storage media".

Software or program modules, including the email manager module 114, conversation manager module 118, and other program modules, may be embodied as one or more instructions stored on computer-readable storage media. Computing device 500 may be configured to implement particular functions corresponding to the software or program modules stored on computer-readable storage media. Such instructions may be executable by one or more articles of manufacture (for example, one or more computing device 500, and/or processors 502) to implement techniques for asynchronous task execution, as well as other techniques. Such techniques include, but are not limited to, the example procedures described herein. Thus, computer-readable storage media may be configured to store instructions that, when executed by one or more devices described herein, cause various techniques for asynchronous task execution.

Computer-readable storage media includes volatile and non-volatile, removable and non-removable media implemented in a method or technology suitable for storage of information such as computer readable instructions, data structures, program modules, or other data. Computer-readable storage media can include, but is not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or another tangible media or article of manufacture suitable to store the desired information and which may be accessed by a computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, comprising:
   identifying metadata associated with a new message by one or more computing devices, the new message being associated with a conversation thread;
   adding the metadata by the one or more computing devices to conversation metadata associated with the conversation thread and attached to a first anchor message associated with the conversation thread to create aggregate thread data as an extension to a header of the first anchor message; and
   moving the aggregate thread data by the one or more computing devices from the first anchor message to the new message to form a next anchor message as an extension to a header of the new message such that the metadata associated with the conversation thread is no longer attached to the first anchor message.

2. The method of claim 1, further comprising storing the aggregate thread data as the extension of the header for the new message.

3. The method of claim 1, further comprising displaying the aggregate thread data as header information associated with the conversation thread.

4. The method of claim 3, wherein the aggregate thread data includes at least one of location of the conversation, conversation categories, conversation folders, conversation flags, conversation participants, or a number of unread or total messages in the conversation thread.

5. The method of claim 1, further comprising identifying the new message as a new anchor message for the conversation thread.

6. The method of claim 5, wherein the conversation thread has a single anchor message.

7. The method of claim 1, further comprising associating the new message with the conversation thread by assigning to the new message an identity that matches a conversation identity that is associated with the conversation thread.

8. The method of claim 1, further comprising determining that the new message is associated with the conversation thread by identifying associations between messages in the conversation thread and the new message, wherein the associations include one or more properties in a header associated with the new message that match one or more header properties associated with the messages in the conversation thread.

9. The method of claim 1, wherein the conversation thread comprises multiple messages each associated with a header, wherein the header for a respective message in the conversation thread includes summary information about the respective message.

10. A system comprising one or more modules implemented at least partially in hardware of one or more computing devices and configured to:
    update aggregate thread data associated with a first anchor message in a conversation thread as an extension to a header of the first anchor message;
    identify metadata associated with a message that is associated with the conversation thread; and
    add the metadata from the message that is associated with the conversation to the aggregate thread data from the first anchor message as an extension to the message that is associated with the conversation to form a next anchor message and remove the aggregate thread data from being associated with the first anchor message.

11. The system of claim 10, wherein the metadata is added to relocate the aggregate thread data to the message, which is a newest message in the conversation thread.

12. The system of claim 10, wherein the one or more modules are configured to update the aggregate thread data responsive to a change in the conversation thread while a user is logged in.

13. The system of claim 10, wherein the one or more modules are configured to update the aggregate thread data if, at user login, the anchor message is not a most recent message in the conversation thread.

14. The system of claim 10, wherein the one or more modules are configured to update the aggregate thread data when the system has excess capacity.

15. The system of claim 10, wherein the message is at least one of an email, an instant message, or a text.

16. The system of claim 10, wherein the one or more modules are further configured to:
    relocate the aggregate thread data from the anchor message to the message responsive to the message being a most recent message associated with the conversation thread; and
    cause the message to be identified as a new anchor message for the conversation thread.

17. The system of claim 10, wherein the one or more modules are further configured to display the aggregate thread data as header information for the conversation thread.

18. One or more computing devices having modules that are implemented at least partially in hardware to:
    identify metadata associated with a new message that is associated with a conversation thread;
    add the metadata to conversation metadata associated with the conversation thread to create aggregate thread data, the conversation metadata stored in a header for a first anchor message associated with the conversation thread as an extension to a header of the anchor message; and move the aggregate thread data from the anchor message to the new message as an extension to a header of the new message to form a next anchor message.

19. The one or more computing devices of claim 18, wherein the instructions further cause the computing device to update the aggregate thread data responsive to a change in the conversation thread during a time when a user is logged in.

20. The one or more computing devices of claim 18, wherein the instructions further cause the computing device to update the aggregate thread data when, at a time of user login, the anchor message is not a most recent message associated with the conversation thread.

\* \* \* \* \*